US008632138B2

(12) United States Patent
Bessette

(10) Patent No.: US 8,632,138 B2
(45) Date of Patent: Jan. 21, 2014

(54) TRACTION ASSEMBLY

(76) Inventor: Robert Bessette, Drummondville (CA)

( * ) Notice: Subject to any disclaimer, the term of this patent is extended or adjusted under 35 U.S.C. 154(b) by 405 days.

(21) Appl. No.: 13/095,106

(22) Filed: Apr. 27, 2011

(65) Prior Publication Data

US 2011/0260527 A1 Oct. 27, 2011

Related U.S. Application Data

(60) Provisional application No. 61/328,252, filed on Apr. 27, 2010.

(51) Int. Cl.
*B62D 55/084* (2006.01)

(52) U.S. Cl.
USPC .......... 305/142

(58) Field of Classification Search
USPC ......... 305/142, 120, 124, 130, 131, 134, 138, 305/139, 165, 157; 180/185, 9.1, 9.21, 180/9.26, 9.28, 9.5; 474/134; 280/250.1, 280/253, 259, 261, 282
See application file for complete search history.

(56) References Cited

U.S. PATENT DOCUMENTS

| | | | | |
|---|---|---|---|---|
| 3,590,935 | A * | 7/1971 | Celia | 180/9.5 |
| 3,841,424 | A * | 10/1974 | Purcell et al. | 180/9.5 |
| 3,860,080 | A * | 1/1975 | Firstenberg | 180/9.1 |
| 4,253,708 | A * | 3/1981 | Haslett | 305/47 |
| 5,954,148 | A * | 9/1999 | Okumura et al. | 180/9.21 |
| 7,182,165 | B1 * | 2/2007 | Keinath et al. | 180/185 |
| 7,201,242 | B2 * | 4/2007 | Tucker, Jr. | 180/9.3 |
| 7,497,530 | B2 * | 3/2009 | Bessette | 305/135 |
| 7,597,161 | B2 * | 10/2009 | Brazier | 180/9.3 |
| D603,880 | S * | 11/2009 | Brazier | D15/28 |
| 7,805,864 | B2 * | 10/2010 | Azure et al. | 37/352 |
| 8,240,782 | B2 * | 8/2012 | Bessette et al. | 305/131 |
| 8,297,383 | B2 * | 10/2012 | Despres | 180/9.5 |
| 8,312,945 | B2 * | 11/2012 | Bessette et al. | 180/9.54 |
| 2009/0194345 | A1 * | 8/2009 | Bessette | 180/9.21 |
| 2010/0276990 | A1 * | 11/2010 | Zuchoski et al. | 305/130 |
| 2011/0315459 | A1 * | 12/2011 | Zuchoski et al. | 180/9.21 |
| 2012/0104840 | A1 * | 5/2012 | Zuchoski et al. | 305/100 |
| 2012/0242141 | A1 * | 9/2012 | Bessette et al. | 305/142 |
| 2012/0326496 | A1 * | 12/2012 | Marchildon et al. | 305/143 |
| 2013/0043085 | A1 * | 2/2013 | Hansen | 180/9.21 |
| 2013/0098696 | A1 * | 4/2013 | Zuchoski et al. | 180/9.62 |

* cited by examiner

*Primary Examiner* — Kiran B Patel
(74) *Attorney, Agent, or Firm* — Brouillette & Partners; Francois Cartier; Robert Brouillette

(57) ABSTRACT

A traction assembly for replacing a wheel on a vehicle is disclosed. The traction assembly uses a traction band disposed about a sprocket wheel, idler wheels and road wheels for propulsion. The idler wheels and road wheels are pivotally mounted to a support frame which is coupled to the sprocket wheel via a support arm. The support arm is pivotally yet non-drivingly connected to the sprocket wheel and is pivotally connected to the support frame. The support arm is able to pivot forwardly and rearwardly, albeit in a limited fashion, with respect to the support frame. Such forward and rearward pivotal movements allow the weight of the vehicle to be transferred on the trailing portion, i.e. either the front or the rear portion, of the support frame depending on the direction of movement of the vehicle, thereby generally preventing the leading portion from diving or digging into the ground.

9 Claims, 5 Drawing Sheets

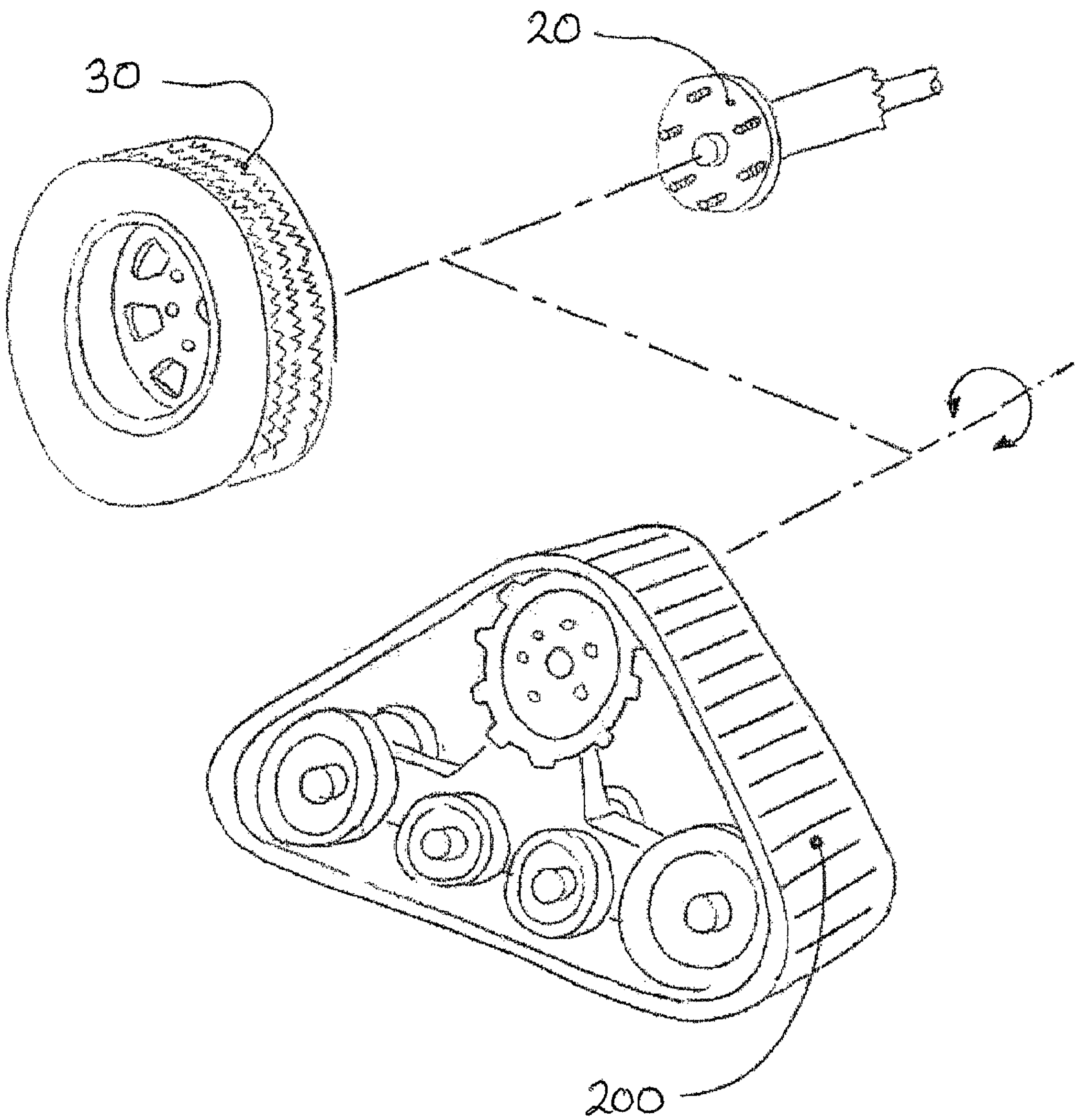
Fig. 1 - Prior Art

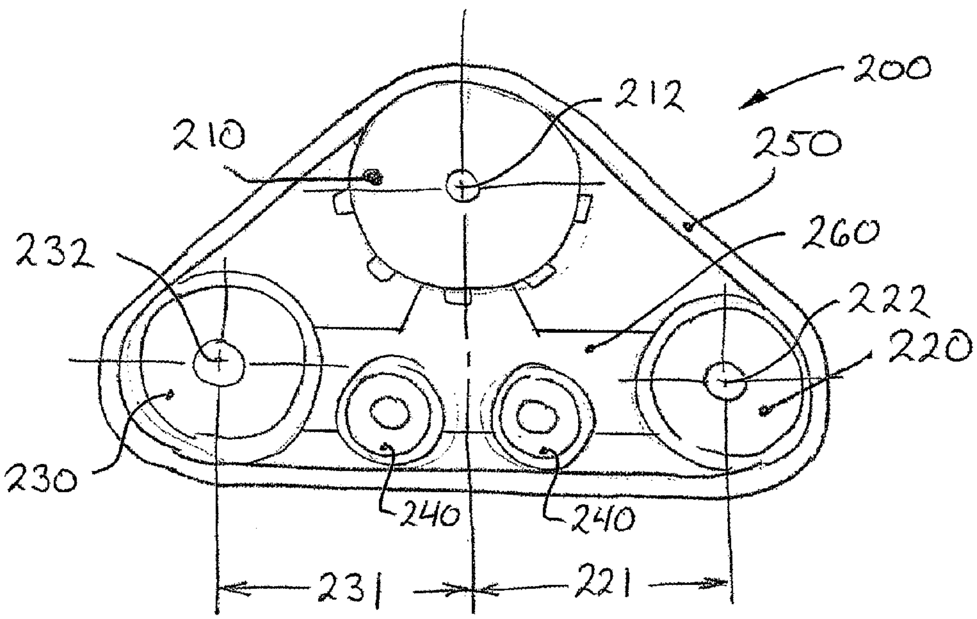
Fig. 2 - Prior Art
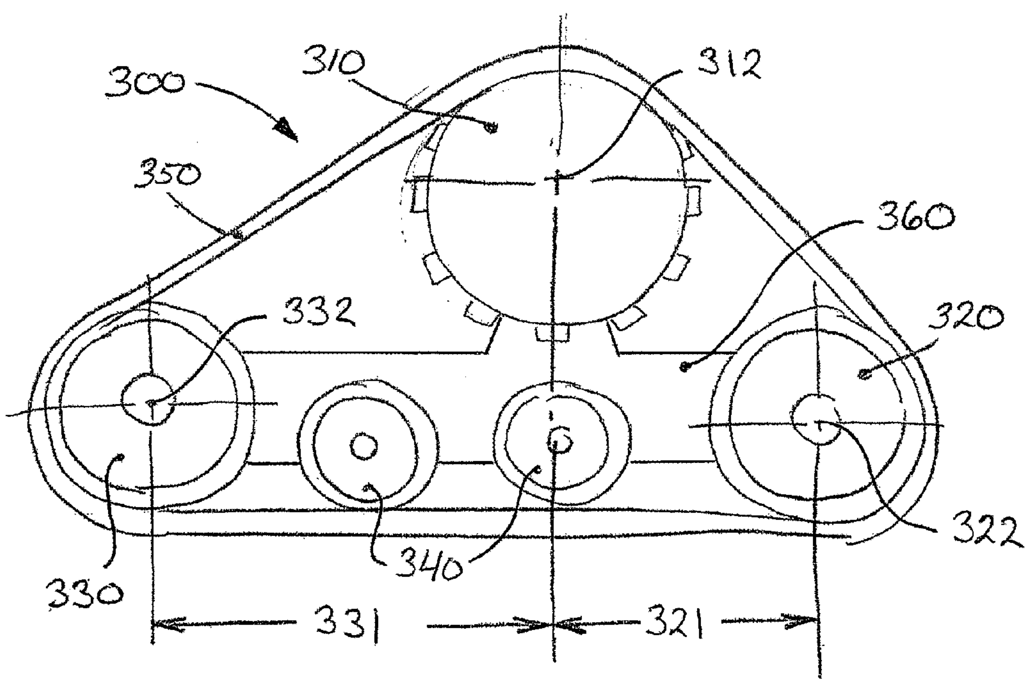
Fig. 3 - Prior Art

TRACTION ASSEMBLY

CROSS-REFERENCE TO RELATED APPLICATIONS

The present patent application claims the benefits of priority of commonly own U.S. Provisional Patent Application No. 61/328,252, entitled "Traction Assembly with Anti-Diving System" and filed at the United States Patent and Trademark Office on Apr. 27, 2010, the content of which is incorporated herein by reference.

FIELD OF THE INVENTION

The present invention generally relates to traction assemblies and track systems using endless traction band for propulsion. More particularly, the present invention relates to traction assemblies and track systems for replacing wheels on typically wheeled vehicles and/or other equipments.

BACKGROUND OF THE INVENTION

Over the years, it has often been found practical to replace the wheels of a wheeled vehicle with traction assemblies which use endless tracks for propulsion.

Traction assemblies are known to generally increase the traction and the floatation of vehicles when used over soft terrains such as, but not limited to, sand, mud and snow.

Hence, nowadays, there exists several different models and configurations of traction assemblies for use on different wheeled vehicles such as, but not limited to, trucks, jeeps, all-terrain vehicles (ATVs), utility-terrain vehicles (UTVs), tractors, front loaders, etc.

Still, despite all the developments in the field of traction assemblies, there remain some problems. For instance, prior art traction assemblies are generally particularly configured to operate in the same normal direction as the vehicle onto which they are mounted. Hence, traction assemblies are generally particularly configured to operate in a forward direction. However, when the vehicle operates in a backward direction, the traction assemblies may operate less efficiently. There is thus a need for a traction assembly which mitigates at least this shortcoming of prior art traction assemblies.

SUMMARY OF THE INVENTION

A traction assembly in accordance with the principles of the present invention generally mitigates the aforementioned shortcoming of prior art traction assemblies by allowing the weight of the vehicle to be substantially automatically transferred on the trailing portion of the traction assembly with respect to the direction of movement of vehicle.

Such a weight transfer generally allows the leading portion of the traction assembly to rise or climb over the ground surface, thereby preventing the traction assembly from diving or digging into the ground surface, particularly when the ground surface is soft.

A traction assembly in accordance with the principles of the present invention is generally configured to be used as a wheel replacement on a typically wheeled vehicle or equipment.

The traction assembly uses a traction band, or endless track, disposed about a sprocket wheel, idler wheels and road wheels for propulsion. The sprocket wheel is configured to be secure to the wheel hub or axle of the vehicle. The idler wheels are respectively pivotally mounted at the front and rear ends of a longitudinally extending support frame while the road wheels are generally pivotally mounted along the length of the support frame.

The support frame is coupled to the sprocket wheel via a pivotable support arm.

At a first or upper extremity, the support arm is pivotally yet non-drivingly connected to the sprocket wheel while at a second or lower extremity, the support arm is pivotally connected to the support frame at a pivot point typically, though not necessarily, located near the middle or central portion of the support frame.

The pivotal connection between the support arm and the support frame allows the support arm to pivot forwardly and rearwardly with respect to the support frame. However, forward and rearward pivotal movements are generally limited by angular blocking elements or stoppers located either on the support frame or on the support arm itself.

The support arm is generally free to pivot with respect to the support frame depending on the direction of the movement of the vehicle.

In that sense, and in accordance with the principles of the present invention, the forward and rearward pivotal movements of the support arm allows the weight of the vehicle to be substantially transferred on the trailing portion of the support frame when the vehicle operates in a particular direction.

Hence, when the vehicle is moving forwardly, the support arm will pivot rearwardly such as to transfer the weight of the vehicle on the trailing portion of the support frame which is the rear portion in this case. This will cause the trailing portion of the support frame to apply more pressure on the ground surface than the leading portion, i.e. front portion. This, in turn, will allow the leading portion to rise with respect to the trailing portion, thereby forming a more effective approaching angle.

When the vehicle is moving rearwardly, the support arm will pivot forwardly such as to transfer the weight of the vehicle on the trailing portion of the support frame, now the front portion. This will cause the trailing portion of the support frame to apply more pressure on the ground surface than the leading portion, now the rear portion. This, in turn, will allow the leading portion to rise with respect to the trailing portion, thereby forming a more effective approaching angle.

Understandably, the leading and trailing portions of the support frame are relative to the direction of the movement of the vehicle. Hence, the front portion of the support frame will be the leading portion when the vehicle moves forwardly and will be the trailing portion when the vehicle moves rearwardly. Similarly, the rear portion of the support frame will be the trailing portion when the vehicle moves forwardly and will be the leading portion when the vehicle moves rearwardly.

Still, in accordance with the principles of the present invention, the support arm is configured to pivot such as to transfer the weight of the vehicle toward the trailing portion of the support frame with respect to the direction of movement of the vehicle.

The skill addressee will thus understand that the pivotal movements of the support arm automatically changes the geometry of the traction assembly such as to shift the weight of the vehicle on the trailing portion of the support frame and such as to change the distribution of the pressure applied on the ground. The pivotal movements of the support arm also improve the approaching angle of the traction assembly when the vehicle travels in a forward or a reverse direction as the weight transfer over the trailing portion allows the leading portion to rise.

Other and further aspects and advantages of the present invention will be obvious upon an understanding of the illustrative embodiments about to be described or will be indicated in the appended claims, and various advantages not referred to herein will occur to one skilled in the art upon employment of the invention in practice. The features of the present invention which are believed to be novel are set forth with particularity in the appended claims.

BRIEF DESCRIPTION OF THE DRAWINGS

The above and other objects, features and advantages of the invention will become more readily apparent from the following description, reference being made to the accompanying drawings in which:

FIG. 1 is a perspective view of a prior art traction assembly for replacing a wheel on a vehicle partially shown.

FIG. 2 is a side view a first configuration of a prior art traction assembly.

FIG. 3 is a side view a second configuration of a prior art traction assembly.

DETAILED DESCRIPTION OF THE PREFERRED EMBODIMENT

Figure 4:
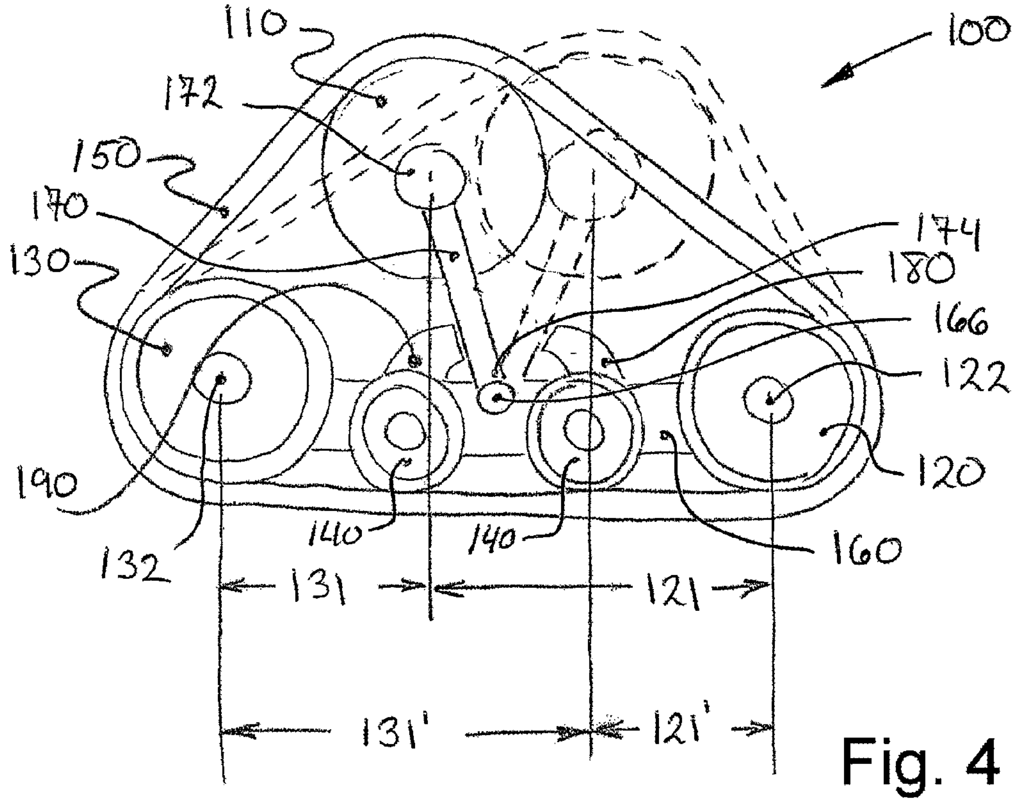
FIG. 4 is a side view of an embodiment of the traction assembly in accordance with the principles of the present invention.

A novel traction assembly will be described hereinafter. Although the invention is described in terms of specific illustrative embodiments, it is to be understood that the embodiments described herein are by way of example only and that the scope of the invention is not intended to be limited thereby.

Referring first to FIGS. 4-6 and 8, a traction assembly 100 in accordance with the principles of the present invention is shown. The traction assembly 100 is generally configured to be used as a wheel replacement on a typically wheeled vehicle 10 or equipment.

As it will be described and explained in more details below, the traction assembly 100 allows the weight of the vehicle 10 to be substantially automatically transferred on the trailing portion of the support frame of the traction assembly 100 with respect to the direction of the movement of the vehicle 10.

Referring now to FIG. 1 and particularly to FIGS. 2 and 3, in most existing traction assemblies, the geometry of the different wheels and of the traction band is typically either symmetric as shown FIG. 2 or asymmetric as shown in FIG. 3.

In FIGS. 2 (and 3), the traction assembly 200 (300) comprises a sprocket wheel 210 (310) configured to be mounted to the wheel hub or axle 20 of the vehicle (see FIG. 1), first idler wheels 220 (320) and second idler wheels 230 (330) pivotally mounted at the respective extremities of a support frame 260 (360), road wheels 240 (340) mounted along the length of the support frame 260 (360) and an endless traction band 250 (350) disposed about the sprocket wheel 210 (310), idler wheels 220 (320) and 230 (330), and road wheels 240 (340).

In a symmetric configuration as in the traction assembly 200, the longitudinal distance 221 between the rotation axis 212 of the sprocket wheel 210 and the rotation axis 222 of the first idler wheels 220 is equal to the longitudinal distance 231 between the rotation axis 212 of the sprocket wheel 210 and the rotation axis 232 of the second idler wheels 230.

In an asymmetric configuration as in the traction assembly 300, the longitudinal distance 321 between the rotation axis 312 of the sprocket wheel 310 and the rotation axis 322 of the first idler wheels 320 is different from the longitudinal distance 331 between the rotation axis 312 of the sprocket wheel 310 and the rotation axis 332 of the second idler wheels 330.

Yet, in both cases, these longitudinal distances are determined in advance and fixed thereafter. Understandably, these distances affect the distribution of ground pressure along the length of the support frame.

Figure 8:
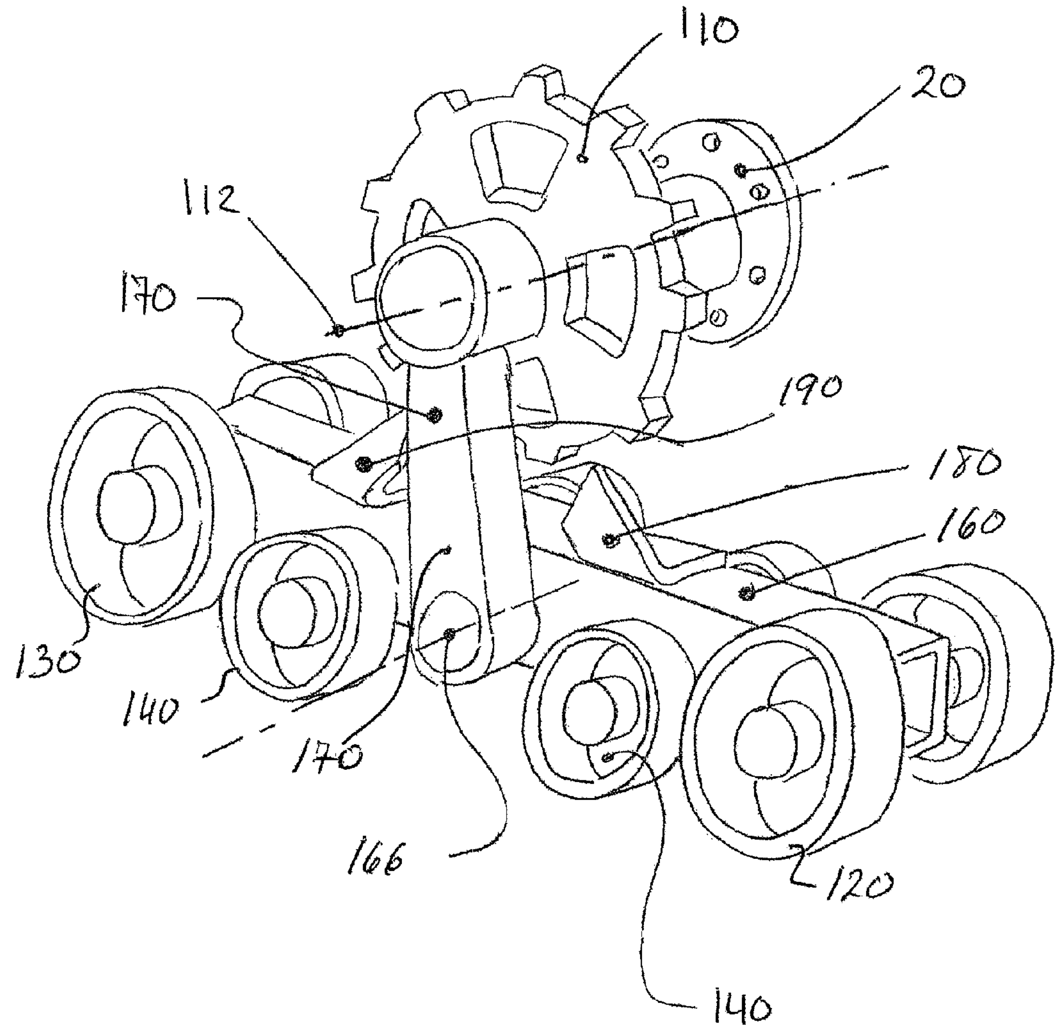
FIG. 8 is a perspective view of the traction assembly of FIG. 4, without the traction band.

Referring now to FIGS. 4 and 8, the traction assembly 100 incorporating the principles of the present invention is shown.

The traction assembly 100 generally comprises a sprocket wheel 110 configured to be mounted to the wheel hub or axle 20 of the vehicle 10 (see FIGS. 1 and 7), first idler wheels 120 pivotally mounted at the front, or first, extremity of a support frame 160, second idler wheels 130 pivotally at the rear, or second, extremity of the support frame 160, and road wheels 140 pivotally mounted along the length of the support frame 160.

The support frame 160 generally comprises a substantially front, or first, portion 162 and a substantially rear, or second, portion 164. The support frame 160 is further coupled to the sprocket wheel 110 via a support arm 170. The upper, or first, extremity 172 of the support arm is pivotally yet non-drivingly connected to the sprocket wheel 110 while the lower, or second, extremity 174 of the support arm 170 is pivotally connected to the support frame 160 at a pivot point 166.

In the present embodiment, the front portion 162 is substantially located between the pivot point 166 and the front extremity of the support frame 160. Similarly, the rear portion 164 is substantially located between the pivot point 166 and the rear extremity of the support frame 160.

As shown in phantom lines, the pivotal connection between the support arm 170 and the support frame 160 allows the support arm 170 to pivot forwardly and rearwardly with respect to the support frame 160 between a first position and second position. Still, the amplitude of the forward and rearward pivotal movements is limited by angular blocking elements or stoppers 180 and 190.

In the present embodiment, the angular stoppers 180 and 190 are fixedly mounted to, or integral with, the support frame 160. Still, in another embodiment, the angular stoppers 180 and 190 could be fixedly mounted to, or be integral with, the support arm 170.

Still referring to FIG. 4, the forward and rearward pivotal movements of the support arm 170 allow the longitudinal distances between the rotation axis 112 of the sprocket wheel 110 and the rotation axes 122 and 132 of the first and second idler wheels 120 and 130 to change.

For instance, as shown in FIG. 4, when the support arm 170 pivot rearwardly and abuts on angular stopper 190, the distance 121 between the rotation axis 112 of the sprocket wheel 110 and the rotation axis 122 of the first idler wheels 120 is greater than the distance 121' between the rotation axis 112 of the sprocket wheel 110 and the rotation axis 122 of the first idler wheels 120 when the support arm 170 pivot forwardly and abuts on angular stopper 180.

Similarly, when the support arm 170 pivot rearwardly and abuts on angular stopper 190, the distance 131 between the rotation axis 112 of the sprocket wheel 110 and the rotation axis 132 of the second idler wheels 130 is smaller than the distance 131' between the rotation axis 112 of the sprocket wheel 110 and the rotation axis 132 of the second idler wheels 130 when the support arm 170 pivot forwardly and abuts on angular stopper 180.

In the present embodiment, distance 121 is equal to distance 131' and similarly, distance 131 is equal to distance 121'. Still, in other embodiments, distances 121 could be different and distances 131 and 121' could also be different.

At this point, it is to be noted that when the support arm 170 pivots rearwardly and abuts on angular stopper 190, the rotation axis 112 of the sprocket wheel 110 is longitudinally located between the rotation axis 132 of the second idler wheels 130 and the pivot point 166 whereas when the support arm 170 pivots forwardly and abuts on angular stopper 180, the rotation axis 112 of the sprocket wheel 110 is longitudinally located between the pivot point 166 and the rotation axis 122 of the first idler wheels 120.

The forward and rearward pivotal movements of the support arm 170 allow the weight of the vehicle 10 to which the traction assembly 100 is mounted to be substantially automatically shifted toward the trailing portion of the support frame 160.

Understandably, and as it will be best understood below, the front portion 162 and the rear portion 164 of the support frame 160 can alternatively be the leading and trailing portions respectively when the vehicle 10 moves forwardly and be the trailing and leading portions respectively when the vehicle 10 moves rearwardly.

Figure 5:
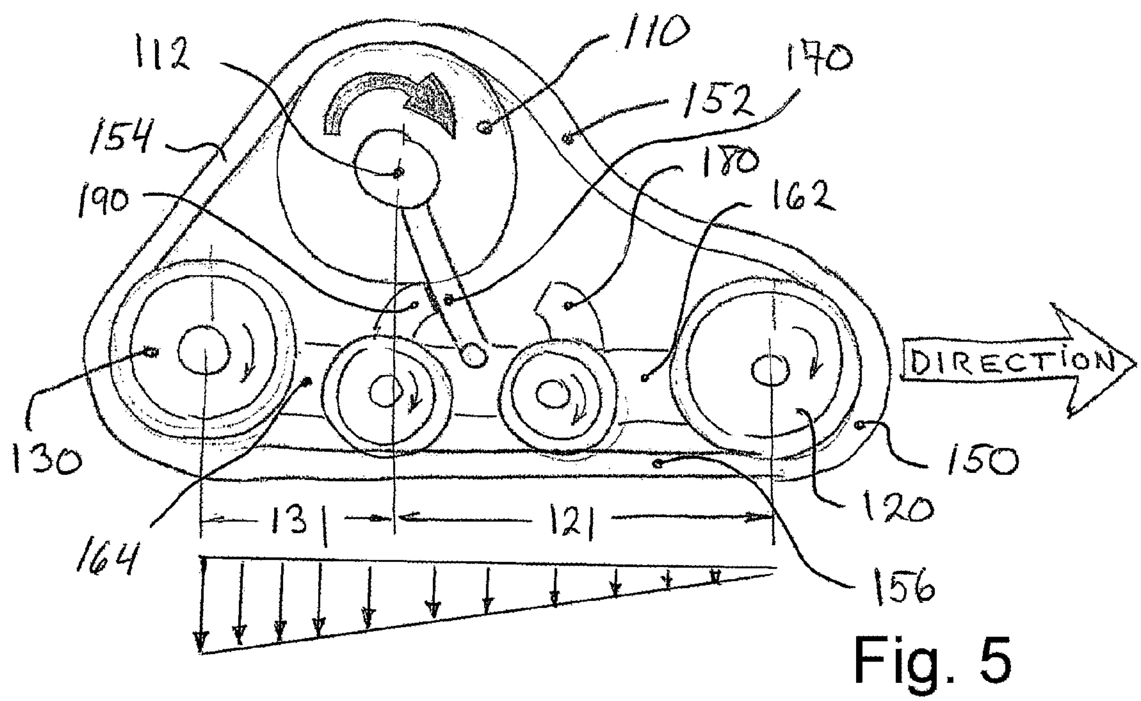
FIG. 5 is a side view of the traction assembly of FIG. 4, when the traction assembly operates in a forward direction.

Referring now to FIG. 5, when the vehicle 10, and the traction assembly 100, moves forwardly, the torque generated by the sprocket wheel 110 pulls on the upper rear portion 154 of the traction band 150, which, in response, pulls back on the sprocket wheel 110. This pulling between the sprocket wheel 110 and the upper rear portion 154 of the traction band 150 causes the support arm 170 to pivot rearwardly until abutment on the angular stopper 190.

When the support arm 170 is abutting on the angular stopper 190, the sprocket wheel 110 is substantially located over the rear portion 164 of the support frame 160, which is the trailing portion of the support frame 160 in this case. The sprocket wheel 110 being so located, this causes the weight of the vehicle 10 to be substantially located over the trailing portion (i.e. the rear portion 164) of the support frame 160. This weight transfer causes the trailing portion (i.e. the rear portion 164) of the support frame 160 to apply more pressure on the ground than the leading portion (i.e. the front portion 162) as shown by the schematic pressure arrows.

Figure 7:
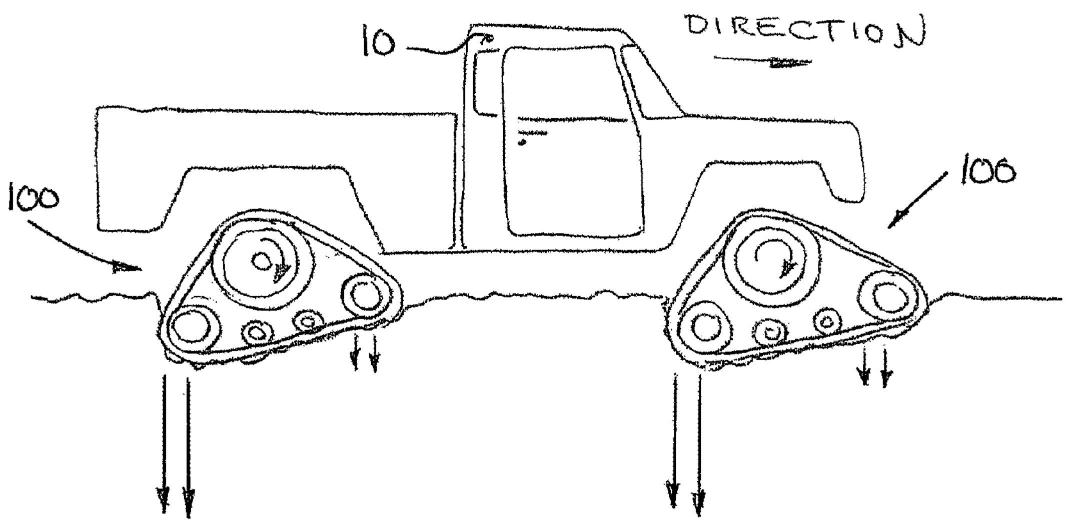
FIG. 7 is a side view of an embodiment of a vehicle equipped with the traction assemblies of FIG. 4, when the vehicle operates in a forward direction.

As shown in FIG. 7, when the vehicle 10 operates over a soft ground surface (e.g. sand, mud, snow, etc.), such a weight transfer also allows the leading portion (i.e. the front portion 162) of the traction assembly 160 to rise with respect to the trailing portion (i.e. the rear portion 164), thereby forming an approaching angle which allows the leading portion (i.e. the front portion 162) to climb over the ground surface instead of digging or diving into it.

Figure 6:
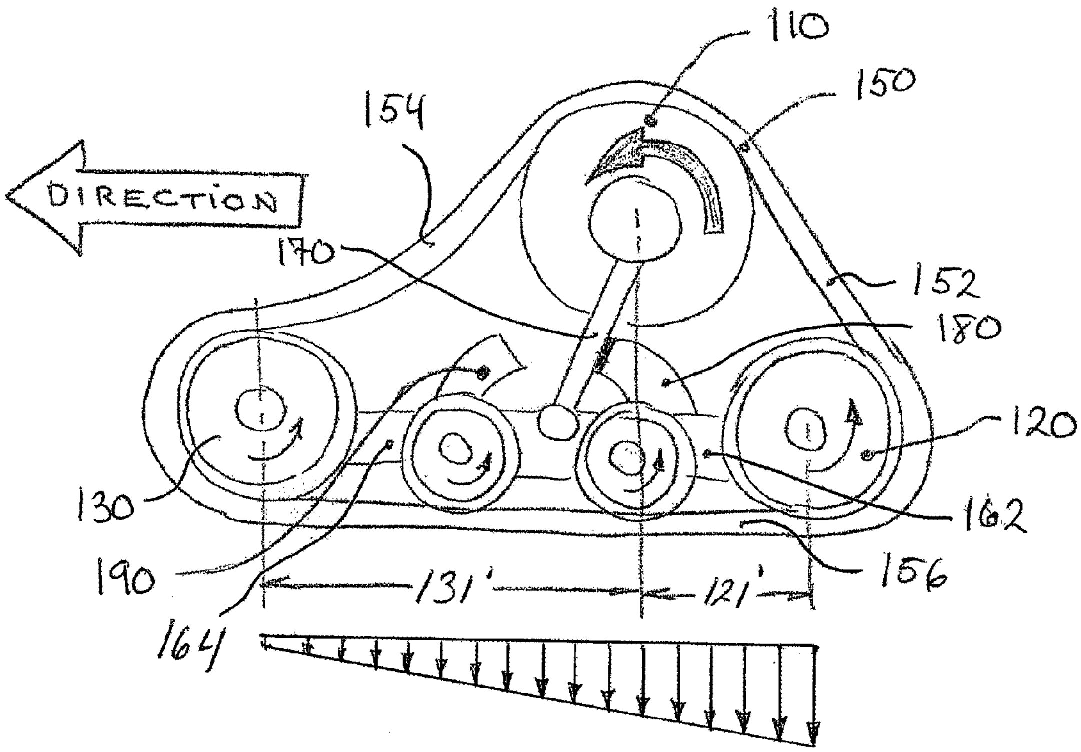
FIG. 6 is a side view of the traction assembly of FIG. 4, when the traction assembly operates in a rearward direction.

Referring now to FIG. 6, when the vehicle 10, and the traction assembly 100, moves in reverse, the torque generated by the sprocket wheel 110 pulls on the upper front portion 152 of the traction band 150, which, in response, pulls back on the sprocket wheel 110. This pulling between the sprocket wheel 110 and the upper front portion 152 of the traction band 150 causes the support arm 170 to pivot forwardly until abutment on the angular stopper 180.

When the support arm 170 is abutting on the angular stopper 180, the sprocket wheel 110 is substantially located over the front portion 162 of the support frame 160, which is the trailing portion of the support frame 160 in this case. The sprocket wheel 110 being so located, this causes the weight of the vehicle 10 to be substantially located over the trailing portion (i.e. the front portion 162) of the support frame 160. This weight transfer causes the trailing portion (i.e. the front portion 162) of the support frame 160 to apply more pressure on the ground than the leading portion (i.e. the rear portion 164) as shown by the schematic pressure arrows.

Again, when the vehicle 10 operates over a soft ground surface (e.g. sand, mud, snow, etc.), such a weight transfer also allows the leading portion (i.e. the rear portion 164) of the traction assembly 160 to rise with respect to the trailing portion (i.e. the front portion 162), thereby forming an approaching angle which allows the leading portion (i.e. the rear portion 164) to climb over the ground surface instead of digging or diving into it.

As the skilled addressee will understand, the rearward or forward pivotal movements of the support arm 170 with respect to the support frame 160 are substantially automatic as the vehicle 10 moves respectively forwardly or rearwardly. These pivotal movements of the support arm 170 therefore substantially automatically shift the weight of the vehicle 10 over the trailing portion of the support frame 160, whether the vehicle 10 moves forwardly or rearwardly. This substantially automatic weight shifting over the trailing portion of the support frame 160 also allows the leading portion to rise with respect to the trailing portion and climb over the ground surface when the traction assembly 100 is operated over soft ground surface (e.g. sand, mud, snow, etc.).

Hence, the person skilled in the art will understand that the traction assembly 100 substantially automatically shifts the weight of the vehicle 10 so that the traction assembly 100 does not dive or dig into the ground surface over which it is operated, whether the vehicle moves forwardly or rearwardly. This, in turn, improves the handling of the vehicle 10 equipped with such traction assemblies 100.

The present traction assembly 100 is particularly useful in applications where the rotation axis of the traction assembly 100 is the same has the rotation axis 112 of the sprocket wheel (see FIG. 1).

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A traction assembly for use as a wheel replacement on a vehicle, the vehicle comprising at least one axle, the traction assembly comprising:

a) a sprocket wheel configured to be mounted to the axle of the vehicle, the sprocket wheel comprising a sprocket wheel rotation axis;

b) a longitudinally extending support frame defining a first end and a second end;

c) at least one first idler wheel pivotally mounted at the first end of the support frame, the at least one first idler wheel comprising a first idler wheel rotation axis;

d) at least one second idler wheel pivotally mounted at the second end of the support frame, the at least one second idler wheel comprising a second idler wheel rotation axis;

e) a support arm defining a first end and a second end, the first end being pivotally yet non-drivingly connected to the sprocket wheel, and the second end being pivotally connected to the support frame at a pivot point;

f) a traction band disposed about the sprocket wheel, the at least one first idler wheel, and the at least one second idler wheel;

wherein the support arm is pivotable between a first position and a second position; and wherein, in the first position, the sprocket wheel rotation axis is longitudinally located between the second idler wheel rotation axis and the pivot point, and in the second position, the sprocket wheel rotation axis is longitudinally located between the pivot point and the first idler wheel rotation axis.

2. A traction assembly as claimed in claim 1, wherein the support frame comprises a first blocking element located between the pivot point and the first end of the support frame, and a second blocking element located between the pivot point and the second end of the support frame, and wherein, in the first position, the support arm abuts on the second blocking element and, in the second position, the support arm abuts on the first blocking element.

3. A traction assembly as claimed in claim 1, wherein the support arm comprises a first blocking element and a second blocking element, and wherein, in the first position, the second blocking element abuts on the support frame and, in the second position, the first blocking element abuts on the support frame.

4. A traction assembly as claimed in claim 1, further comprising road wheels pivotally mounted to the support frame between the at least one first idler wheel and the at least one second idler wheel, and wherein the traction band is disposed about the sprocket wheel, the at least one first idler wheel, the at least one second idler wheel, and the road wheels.

5. A traction assembly as claimed in claim 1, wherein a longitudinal distance between the second idler wheel rotation axis and the pivot point is equal to a longitudinal distance between the first idler wheel rotation axis and the pivot point.

6. A traction assembly as claimed in claim 1, wherein, in the first position, the second idler wheel rotation axis and the sprocket wheel rotation axis define a first longitudinal distance, and in the second position, the second idler wheel rotation axis and the sprocket wheel rotation axis define a second longitudinal distance, the second longitudinal distance being different from the first longitudinal distance.

7. A traction assembly as claimed in claim 6, wherein, in the first position, the sprocket wheel rotation axis and the first idler wheel rotation axis define a third longitudinal distance, and in the second position, the sprocket wheel rotation axis and the first idler wheel rotation axis define a fourth longitudinal distance, the third longitudinal distance being different from the fourth longitudinal distance.

8. A traction assembly as claimed in claim 1, wherein the support frame comprises a first portion comprising a portion of the support frame between the first end of the support frame and the pivot point, and a second portion comprising a portion of the support frame between the second end of the support frame and the pivot point.

9. A traction assembly as claimed in claim 8, wherein, in the first position, the sprocket wheel rotation axis is located over the second portion of the support frame, and in the second position, the sprocket wheel rotation axis is located over the first portion of the support frame.

* * * * *